United States Patent
Mori

(10) Patent No.: US 12,431,592 B2
(45) Date of Patent: Sep. 30, 2025

(54) BATTERY PACK

(71) Applicant: Murata Manufacturing Co., Ltd., Nagaokakyo (JP)

(72) Inventor: Michiya Mori, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 545 days.

(21) Appl. No.: 17/897,742

(22) Filed: Aug. 29, 2022

(65) Prior Publication Data

US 2022/0416367 A1    Dec. 29, 2022

Related U.S. Application Data

(63) Continuation of application No. PCT/JP2020/047901, filed on Dec. 22, 2020.

(30) Foreign Application Priority Data

Mar. 3, 2020  (JP) ................................. 2020-036218
Apr. 13, 2020  (JP) ................................. 2020-071780

(51) Int. Cl.
*H01M 50/509*    (2021.01)
*H01M 50/213*    (2021.01)
*H01M 50/505*    (2021.01)

(52) U.S. Cl.
CPC ....... *H01M 50/509* (2021.01); *H01M 50/213* (2021.01); *H01M 50/505* (2021.01)

(58) Field of Classification Search
CPC . H01M 50/509; H01M 50/505; H01M 50/213
See application file for complete search history.

(56) References Cited

U.S. PATENT DOCUMENTS

2018/0190960 A1* 7/2018 Harris .................. H01M 50/20
2020/0358068 A1   11/2020 Omura et al.

FOREIGN PATENT DOCUMENTS

| CN | 204011498 U | 12/2014 |
| CN | 208819969 U | 5/2019 |
| JP | 2001006652 A | 1/2001 |
| JP | 2004031049 A | 1/2004 |
| JP | 2005317458 A | 11/2005 |
| JP | 2018005984 A | 1/2018 |

(Continued)

OTHER PUBLICATIONS

Office Action in CN202080097783.3, mailed Dec. 29, 2023, 6 pages.

(Continued)

*Primary Examiner* — Jane J Rhee
(74) *Attorney, Agent, or Firm* — Keating & Bennett, LLP

(57) ABSTRACT

A battery pack includes a battery assembly including six batteries each having a cylindrical external shape, and electrode terminals at both end portions in a cylindrical axis direction, respectively, are arranged in a second direction perpendicular to the cylindrical axis direction in which cylindrical axes thereof are in parallel or substantially in parallel, and a tab to connect the electrode terminals of the six batteries. Assuming that three batteries arranged in the second direction are a first battery, a second battery, and a third battery in this order, the tab is connected to the first battery and the third battery without being connected to the second battery.

15 Claims, 16 Drawing Sheets

(56) References Cited

FOREIGN PATENT DOCUMENTS

JP          2019192371  A    10/2019
WO          2019124109  A1    6/2019

OTHER PUBLICATIONS

International Search Report in PCT/JP2020/047901, mailed Mar. 23, 2021, 3 pages.
Written Opinion in PCT/JP2020/047901, mailed Mar. 23, 2021, 4 pages.

* cited by examiner

BATTERY PACK

CROSS REFERENCE TO RELATED APPLICATIONS

This application claims the benefit of priority to Japanese Patent Application No. 2020-071780 filed on Apr. 13, 2020 and Japanese Patent Application No. 2020-036218 filed on Mar. 3, 2020, and is a Continuation Application of PCT Application No. PCT/JP2020/047901 filed on Dec. 22, 2020. The entire contents of each application are hereby incorporated herein by reference.

BACKGROUND OF THE INVENTION

1. Field of the Invention

The present invention relates to a battery pack.

2. Description of the Related Art

A known packed battery includes a battery block assembly, in which a plurality of cylindrical secondary batteries are arranged vertically and horizontally, and a storage case storing the battery block assembly (see, for example, Japanese Unexamined Patent Application Publication No. 2005-317458). In the battery block assembly, the plurality of cylindrical secondary batteries are arranged so that adjacent secondary batteries are disposed in a bale-stacking manner while having a posture perpendicular to a specific surface of the case. This packed battery further includes a lead plate which is commonly coupled to electric power of the plurality of secondary batteries of the battery block assembly so as to connect the plurality of secondary batteries in parallel. In this packed battery, the adjacent cylindrical secondary batteries are arranged in a bale-stacking manner within a limited space in the storage case. Therefore, even when an external force is applied to the packed battery due to, for example, dropping of the packed battery to the ground and collision between the packed batteries disposed adjacent to each other, crushing of the secondary battery is suppressed and a safe state is maintained.

However, in the packed battery described in Japanese Unexamined Patent Application Publication No. 2005-317458, since the plurality of secondary batteries are arranged in a bale-stacking manner within the limited space in the storage case, the adjacent secondary batteries are close to each other. Therefore, in a case of firing of one secondary battery, because the batteries are disposed within the limited space, heat transferred through the lead plate and heat transferred through air existing in a gap between the secondary batteries are concentrated on the secondary battery adjacent to the firing battery. As a result, the secondary battery adjacent to the secondary battery that catches fire first may be heated to a high temperature, and may catch fire secondarily.

SUMMARY OF THE INVENTION

Preferred embodiments of the present invention provide battery packs which each reduce or prevent spread of fire to other batteries when one of a plurality of batteries disposed in a preset space catches fire.

A battery pack according to a preferred embodiment of the present invention includes a battery assembly including a plurality of batteries having a cylindrical or substantially cylindrical external shape arranged in a first direction perpendicular or substantially perpendicular to a cylindrical axis direction thereof in which cylindrical axes are in parallel or substantially parallel, the plurality of batteries each including electrode terminals at an end portion on a positive side and at an end portion on a negative side in the cylindrical axis direction, respectively; and a tab to connect the electrode terminals at the end portions of the plurality of batteries on the positive side, respectively, wherein the plurality of batteries include a first battery, a second battery, and a third battery arranged in order of the first battery, the second battery, and the third battery, and the tab includes a first tab to be connected to the first battery and the third battery without being connected to the second battery.

Further, in a battery pack according to a preferred embodiment of the present invention, the plurality of batteries may include a fourth battery adjacent to the third battery on a side opposite from the second battery and to which the first tab is not connected, the tab may include a second tab, and the second tab may be connected to the second battery and the fourth battery without being connected to the first battery or the third battery.

Further, in a battery pack according to a preferred embodiment of the present invention, the first tab may intersect with the second tab at least at one point when seen in plan view from the positive side in the cylindrical axis direction.

Further, in a battery pack according to a preferred embodiment of the present invention, the first tab may intersect with the second tab at least at one point when seen in plan view from a second direction perpendicular or substantially perpendicular to the cylindrical axis direction and the first direction.

Further, in a battery pack according to a preferred embodiment of the present invention, the plurality of batteries may further include a fifth battery adjacent to the first battery in the second direction, a sixth battery adjacent to the second battery in the second direction, a seventh battery adjacent to the third battery in the second direction, and an eighth battery adjacent to the fourth battery in the second direction, the first tab may be connected to the sixth battery and the eighth battery without being connected to the fifth battery and the seventh battery, and the second tab may be connected to the fifth battery and the seventh battery without being connected to the sixth battery and the eighth battery.

Further, in a battery pack according to a preferred embodiment of the present invention, the first battery and the second battery may include positive electrode terminals at the end portions on the positive side in the cylindrical axis direction, respectively, and the third battery and the fourth battery may include negative electrode terminals at the end portions on the positive side in the cylindrical axis direction, respectively.

Further, in a battery pack according to a preferred embodiment of the present invention, the tab may include a plurality of subtabs.

According to preferred embodiments of the present invention, the first battery, the second battery, and the third battery are arranged in order of the first battery, the second battery, and the third battery, and the first tab is connected to the first battery and the third battery without being connected to the second battery. Therefore, when one of the plurality of batteries catches fire, heat is able to be reduced or prevented from being concentratively transferred to another battery adjacent to the battery on fire. Thus, spread of fire to another battery adjacent to the firing battery due to heating of the other battery to the high temperature is able to be reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiment 1

Hereinafter, preferred embodiments of the present invention are described in detail with reference to the drawings. A battery pack according to Preferred Embodiment 1 includes a first battery assembly including three or more cylindrical batteries parallelly or substantially parallelly aligned in one direction such that cylindrical axis directions thereof are in parallel or substantially in parallel, and at least one tab connecting an electrode terminal of any one of the three or more batteries to an electrode terminal of another one of the three or more batteries other than the battery adjacent to the one battery in the one direction.

Figure 1:
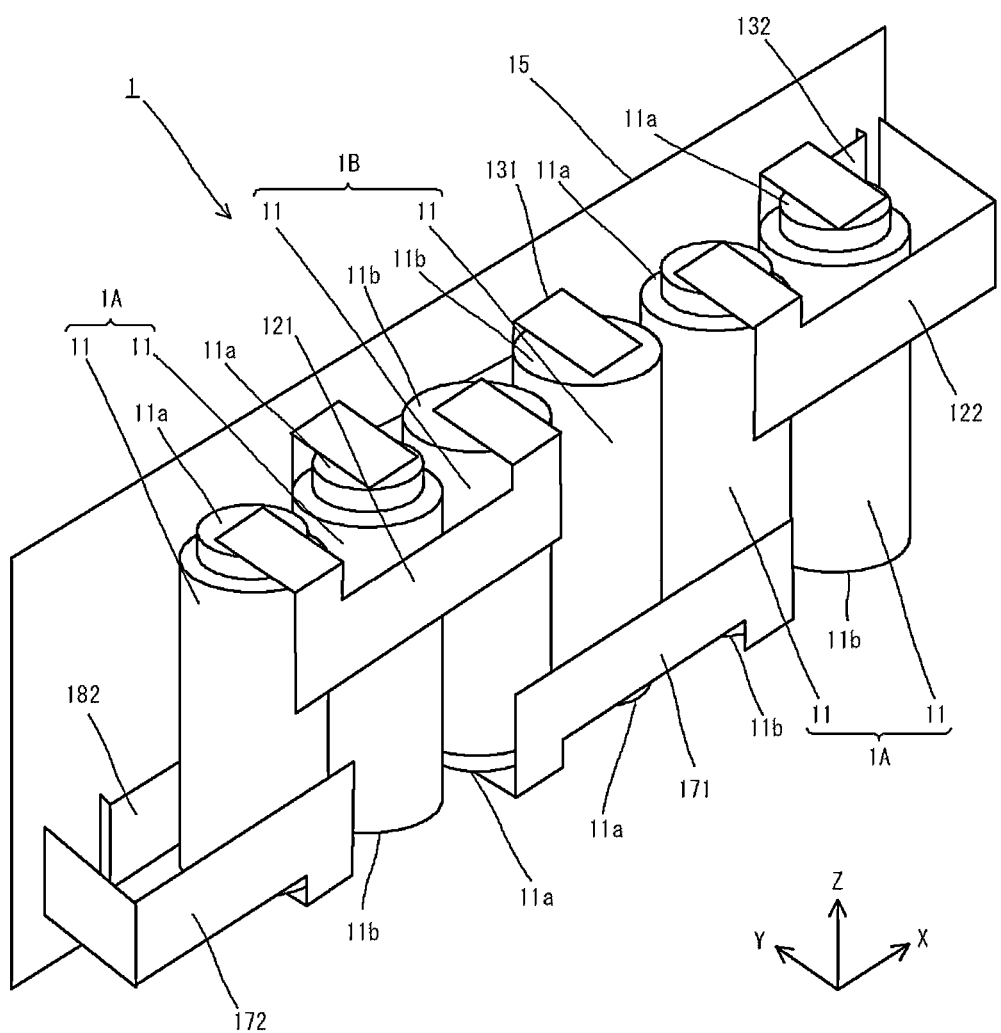
FIG. 1 is a perspective view of a battery pack according to Preferred Embodiment 1 of the present invention.
Figure 2A:
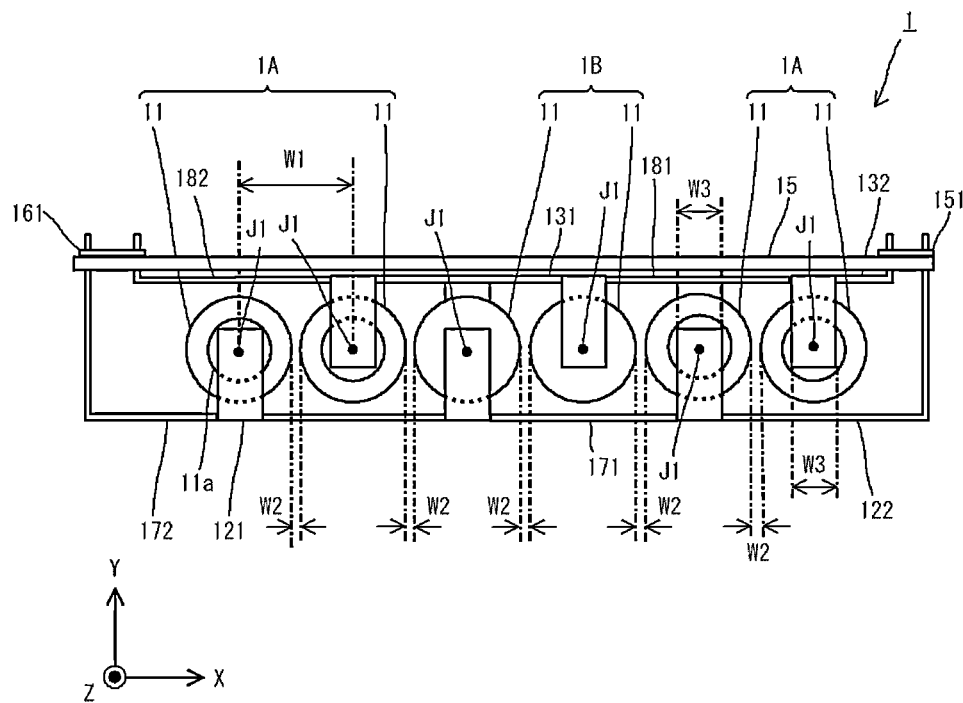
FIG. 2A is a plan view of the battery pack according to Preferred Embodiment 1 of the present invention.
Figure 2B:
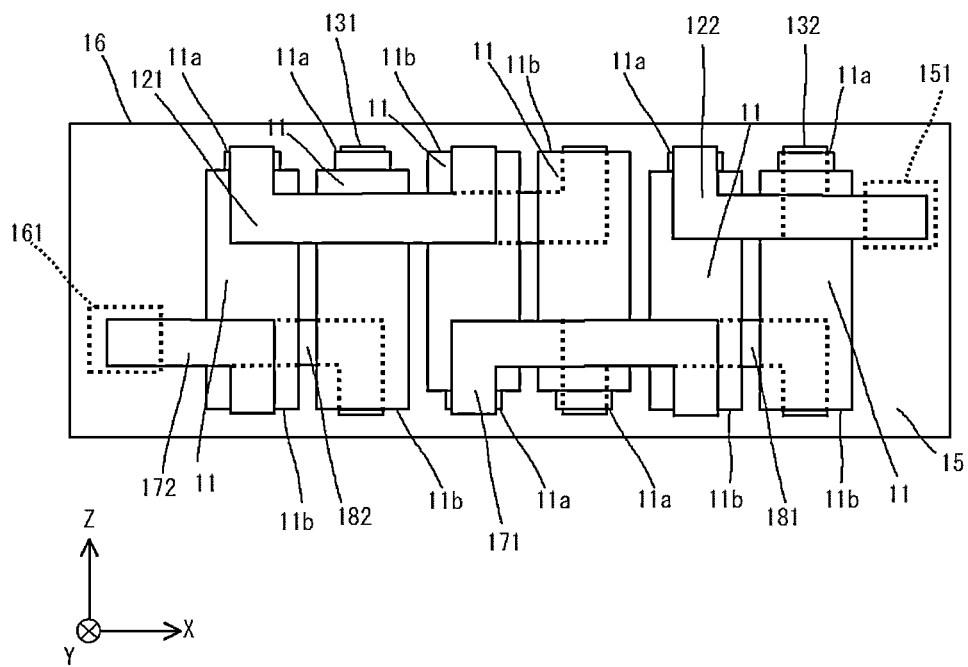
FIG. 2B is a side view of the battery pack according to Preferred Embodiment 1 of the present invention.

As illustrated in FIG. 1 and FIGS. 2A and 2B, a battery pack 1 according to the present preferred embodiment includes a battery assembly including six batteries 11 arranged in a first direction (that is, an X-axis direction) perpendicular or substantially perpendicular to a cylindrical axis direction in which cylindrical axes thereof are in parallel or substantially in parallel, tabs 121, 122, 131, 132, 171, 172, 181 and 182, and printed circuit boards (hereinafter, referred to as a "PCB") 15 and 16.

The batteries 11 are rechargeable secondary batteries, for example. As the secondary battery, for example, a lithium-ion battery, a nickel metal hydride battery, a nickel-cadmium battery, or the like may be used. Each of the six batteries 11 is a cylindrical battery having a cylindrical or substantially cylindrical external shape, and includes electrode terminals at an end portion on a positive side (that is, on a +Z direction side) and at an end portion on a negative side (that is, on a −Z direction side) in a direction of the cylindrical axis J1, respectively. That is, the battery 11 includes a positive electrode terminal 11a which is the electrode terminal provided to one end portion in the direction of the cylindrical axis J1, and a negative electrode terminal 11b which is the electrode terminal provided to the other end portion in the direction of the cylindrical axis J1. Further, the six batteries 11 are parallelly or substantially parallelly and linearly or substantially linearly aligned in the X-axis direction in where the directions of the cylindrical axes J1 are in parallel or substantially in parallel. Moreover, as illustrated in FIG. 2A, the six batteries 11 are parallelly or substantially parallelly aligned at an equal or substantially equal interval such that the shortest distance between the adjacent batteries 11 becomes a distance W2. A distance between the cylindrical axes J1 of the six batteries 11 is constant or substantially constant at a distance W1.

Further, the six batteries 11 include a first battery set 1A and a second battery set 1B. The first battery set 1A includes two batteries 11 each disposed such that a direction from the positive electrode terminal 11a to the negative electrode terminal 1ib in the direction of the cylindrical axis J1 matches the −Z direction. The second battery set 1B includes two batteries each disposed such that the direction from the positive electrode terminal 11a to the negative electrode terminal 1ib in the direction of the cylindrical axis J1 matches the +Z direction (the positive direction in the direction of the cylindrical axis J1). Then, two first battery sets 1A and one second battery set 1B are alternately arranged in the X-axis direction.

Each of the tabs 121, 122, 131, 132, 171, 172, 181, and 182 is made of a metal plate such as, for example, Cu and Al. As illustrated in FIGS. 2A and 2B, widths W3 of the tabs 121, 122, 131, 132, 171, 172, 181, and 182 in a direction perpendicular or substantially perpendicular to their extending direction and thickness direction are the same or substantially the same. Here, the tabs 121, 122, 131, and 132 connect the electrode terminals at the end portions of the six batteries 11 on the positive side (that is, +Z direction side). The tabs 122 and 132 are each fixed at one end portion to a PCB 15, and are electrically connected to each other through a conductive pattern 151 provided in the PCB 15. Further, the tab 122 is electrically connected to the positive electrode terminal 11*a* of the battery 11 at the second in the −X direction from the battery 11 on the most +X direction side. Moreover, the tab 132 is electrically connected to the positive electrode terminal 11*a* of the battery 11 on the most +X direction side. The tabs 122 and 132 may be electrically connected to each other through the conductive pattern 151 provided at the PCB 15. The tab 121 electrically connects the positive electrode terminal 11*a* of the battery 11 on the most −X direction side to the negative electrode terminal 11*b* of the battery 11 at the third from the most −X direction side. The tab 131 electrically connects the positive electrode terminal 11*a* of the battery 11 at the second in the +X direction from the battery 11 on the most −X direction side, to the negative electrode terminal 11*b* of the battery 11 at the fourth in the +X direction from the battery 11 on the most −X direction side. That is, each of the tabs 121 and 131 connects the positive electrode terminal 11*a* provided to any one of the six batteries 11 to the negative electrode terminal 11*b* of another battery 11 other than the battery 11 adjacent to the one battery 11 in the X-axis direction. Moreover, assuming that the battery 11 on the most −X direction side is a first battery, the battery 11 adjacent to the first battery on the +X direction side is a second battery, and the battery 11 adjacent to the second battery on the +X direction side is a third battery, the tab 121 is connected to the first battery and the third battery without being connected to the second battery. Further, assuming that the battery 11 adjacent to the third battery on the opposite side from the second battery (that is, on the +X direction side) is a fourth battery, the tab 131 is connected to the second battery and the fourth battery without being connected to the first battery or the third battery. Each of the tabs 121, 122, 131, and 132 is welded to the positive electrode terminal 11*a* of the battery 11 and the negative electrode terminal 11*b* of the battery 11 by, for example, resistance spot welding, laser spot welding, or the like.

Figure 3:
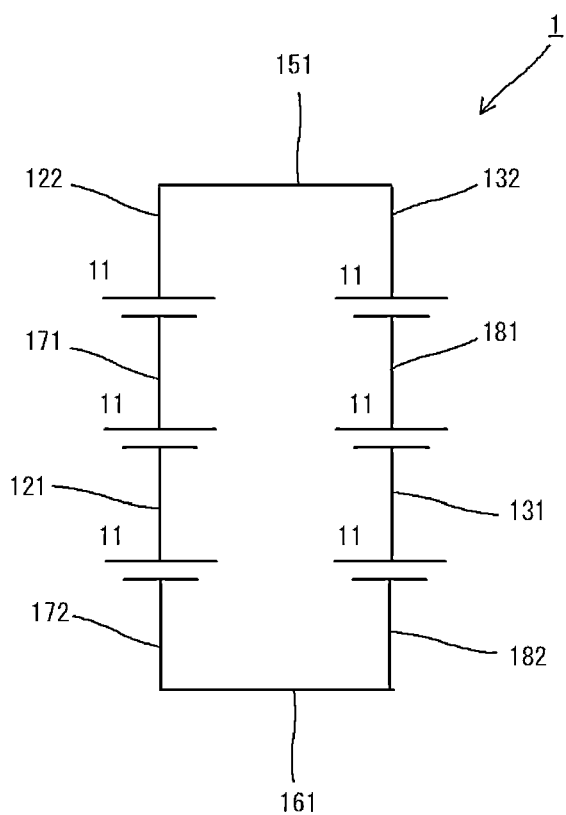
FIG. 3 is a circuit diagram of the battery pack according to Preferred Embodiment 1 of the present invention.

The tabs 172 and 182 are each fixed at one end portion to the PCB 15, and are electrically connected to each other through a conductive pattern 161 provided in the PCB 15. Further, the tab 172 is electrically connected to the negative electrode terminal 11*b* of battery 11 on the most −X direction side. Moreover, the tab 182 is electrically connected to the negative electrode terminal 11*b* of the battery 11 at the second in the +X direction from the battery 11 on the most −X direction side. The tab 171 electrically connects the positive electrode terminal 11*a* of the battery 11 at the third in the +X direction from the battery 11 on the most −X direction side, to the negative electrode terminal 11*b* of the battery 11 at the fifth in the +X direction from the battery on the most −X direction side. The tab 181 electrically connects the negative electrode terminal 11*b* of the battery 11 on the most +X direction side to the positive electrode terminal 11*a* of the battery 11 at the third in the −X direction from the battery 11 on the most +X direction side. That is, each of the tabs 171 and 181 connects the positive electrode terminal 11*a* provided to any one of the six batteries 11 to the negative electrode terminal 11*b* of another battery 11 other than the battery 11 adjacent to the one battery 11 in the X-axis direction. Each of the tabs 171, 172, 181, and 182 is welded to the positive electrode terminal 11*a* of the battery 11 and the negative electrode terminal 11*b* of the battery 11 by, for example, resistance spot welding, laser spot welding, or the like. Then, as illustrated in FIG. 3, the six batteries 11 are connected to each other between the conductive patterns 151 and 161 of the PCB 15 to be two in parallel and three in series by the tabs 121, 122, 131, 132, 171, 172, 181, and 182.

Figure 4A:
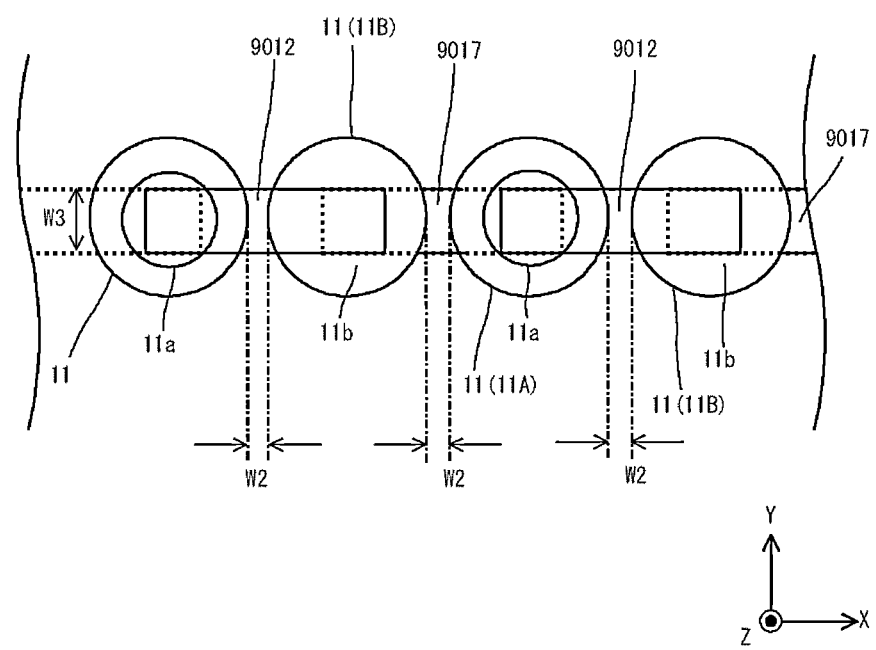
FIG. 4A is a plan view of a battery pack according to a comparative example.
Figure 4B:
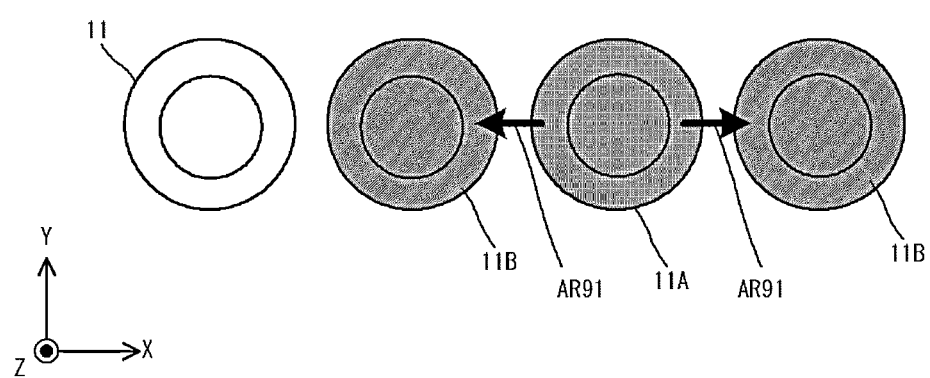
FIG. 4B is a view illustrating functions of the battery pack according to the comparative example.

Here, functions of the battery pack 1 according to the present preferred embodiment are described while being compared with a comparative example. As illustrated in FIG. 4A, a battery pack according to the comparative example includes tabs 9012 and 9017 having a width W3 and extending in the X-axis direction. In the battery pack according to the comparative example, between a battery 11A and a battery 11B, a heat transfer path through the tabs 9012 and 9017 and a heat transfer path through air existing between the battery 11A and the battery 11B are provided. Here, for example, when a large amount of heat is generated due to firing of the battery 11A, as indicated by arrows AR91 in FIG. 4B, the heat generated in the battery 11A is concentratively transferred to the adjacent battery 11B, which increases the possibility of heating the battery 11B to be higher than an ignition temperature.

Figure 5A:
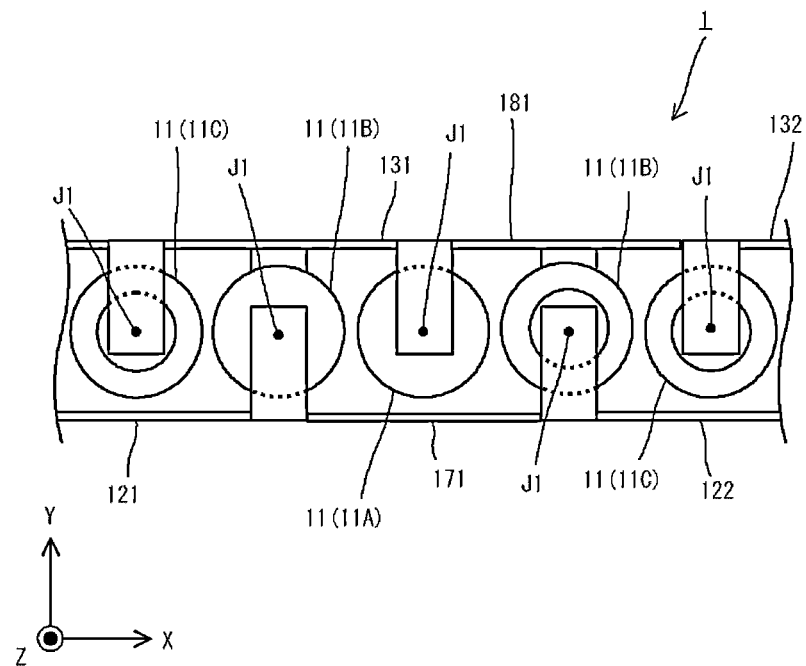
FIG. 5A is a partial plan view of the battery pack according to Preferred Embodiment 1 of the present invention.
Figure 5B:
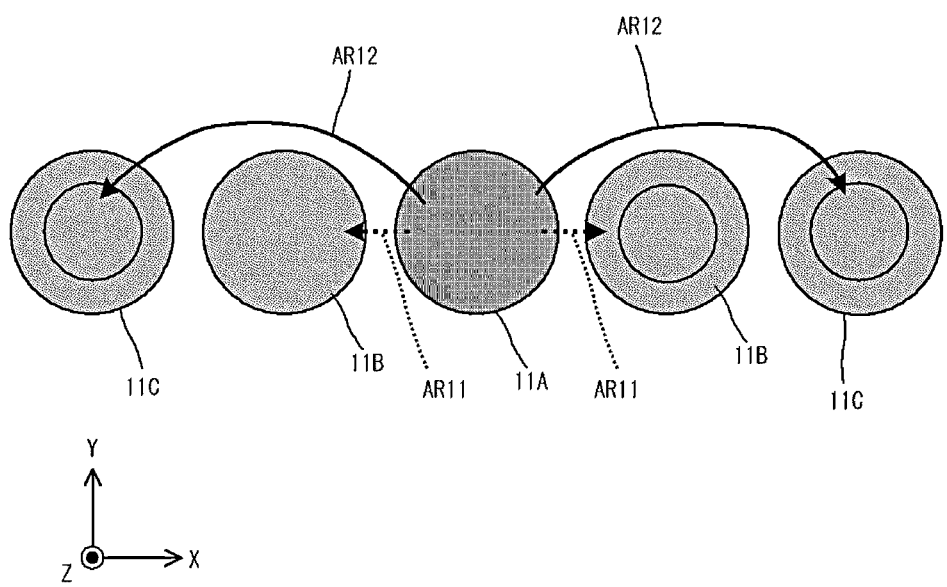
FIG. 5B is a view illustrating functions of the battery pack according to Preferred Embodiment 1 of the present invention.

On the other hand, in the battery pack 1 according to the present preferred embodiment, as illustrated in FIG. 5A, between the battery 11A and the battery 11B, only the heat transfer path through air existing between the battery 11A and the battery 11B is provided. Further, between the battery 11A and a battery 11C, a heat transfer path through the tabs 121, 131, 171, and 181 and a heat transfer path through air existing between the battery 11A and the battery 11C are provided. Therefore, between the battery 11A and the battery 11B, since the heat transfer path through the tabs 121, 131, 171, and 181 is not provided, the thermal resistance becomes larger than that in the comparative example. Thus, the thermal resistance between the battery 11A and the battery 11B becomes a magnitude near a thermal resistance between the battery 11A and battery 11C when compared to that in the comparative example. Accordingly, for example, when a large amount of heat is generated due to firing of the battery 11A, while the amount of heat transferred to the battery 11B from the battery 11A decreases as indicated by arrows AR11 in FIG. 5B, the amount of heat transferred to the battery 11C from the battery 11A increases as indicated by arrows AR12 in FIG. 5B. As a result, since the heat generated in the battery 11A is equally transferred to the batteries 11B and 11C, the excessive increase in temperature in the batteries 11B and 11C can be reduced or prevented.

As described above, in the battery pack 1 according to the present preferred embodiment, the tabs 121 and 131 each connect the positive electrode terminal 11*a* provided to any one of the six batteries 11 to the negative electrode terminal 11*b* of another battery 11 other than the battery 11 adjacent to the one battery 11 in the X-axis direction. Further, the tabs 171 and 181 each connect the positive electrode terminal 11*a* provided to any one of the six batteries 11 to the negative electrode terminal 11*b* of another battery 11 other than the battery 11 adjacent to the one battery 11 in the X-axis direction. Therefore, in the case of firing of one of the six batteries 11, heat is reduced or prevented from being concentratively transferred to the battery 11 adjacent to the firing battery 11. Thus, spread of fire to the battery 11 adjacent to the firing battery 11 due to heating of the battery 11 to the high temperature can be reduced or prevented.

Preferred Embodiment 2

In a battery pack according to Preferred Embodiment 2, the shape of a tab is different from that in the battery pack 1 according to Preferred Embodiment 1. In detail, it is different in that one tab intersects with another tab at one point when seen in plan view from the positive side in the direction of the cylindrical axis J1 (that is, +Z direction).

Figure 6A:
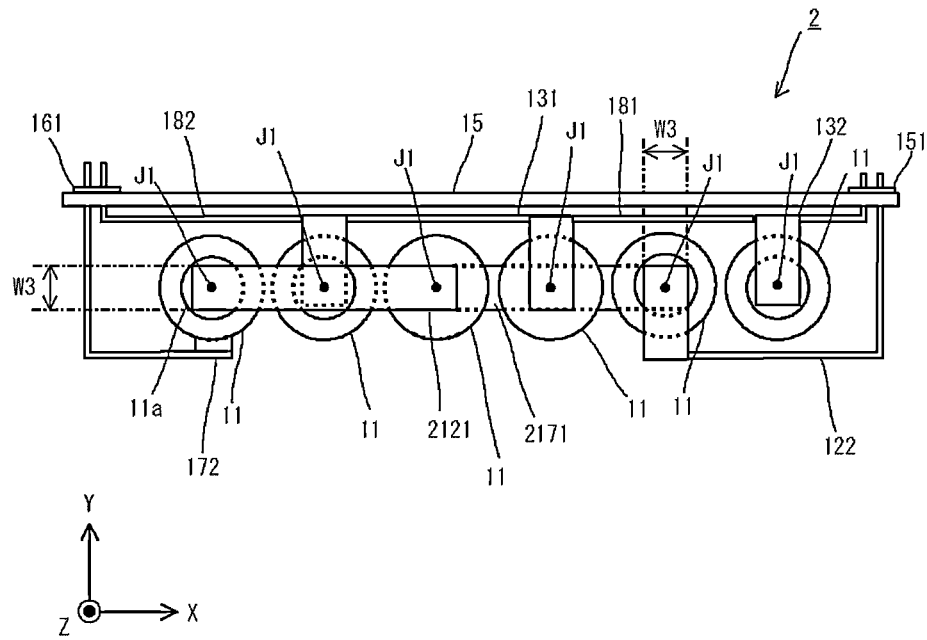
FIG. 6A is a plan view of a battery pack according to Preferred Embodiment 2 of the present invention.
Figure 6B:
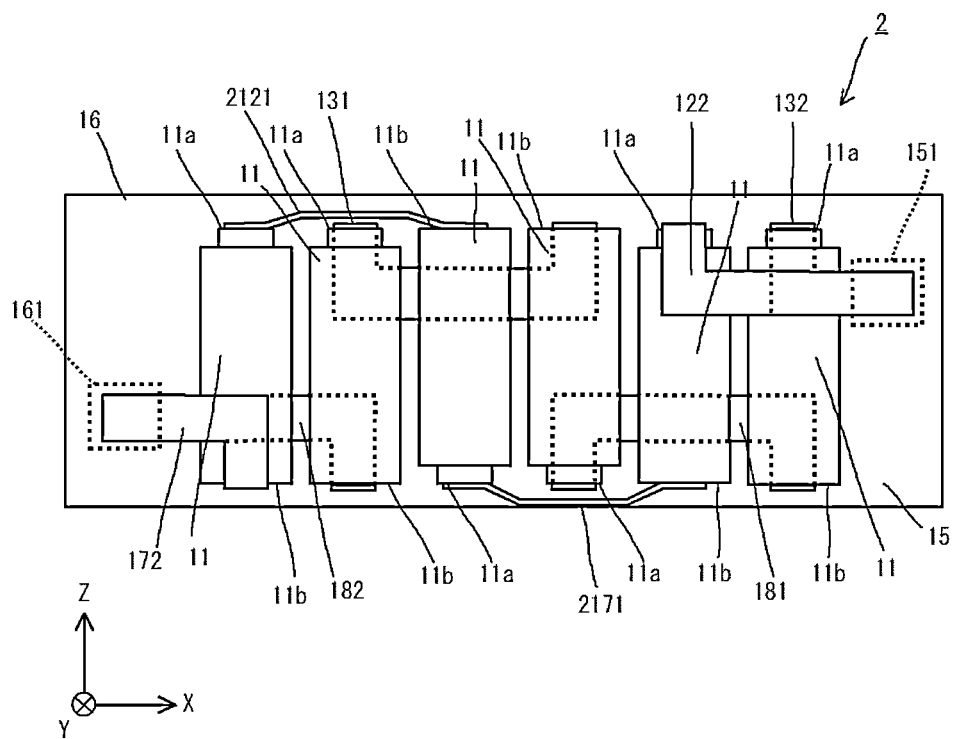
FIG. 6B is a side view of the battery pack according to Preferred Embodiment 2 of the present invention.

As illustrated in FIGS. 6A and 6B, a battery pack 2 according to the present preferred embodiment includes six batteries 11, tabs 2121, 122, 131, 132, 2171, 172, 181, and 182, and the PCBs 15 and 16. In FIGS. 6A and 6B, configurations the same as or similar to Preferred Embodiment 1 are assigned with the same reference characters as in FIGS. 2A and 2B.

The tab 2121 intersects with the tab 131 at one point when seen in plan view from the positive side in the direction of the cylindrical axis J1 (that is, +Z direction). Here, assuming that the tab 131 is a second tab, the tab 2121 corresponds to a first tab. The tab 2121 has an elongated plate shape, and both end portions in a longitudinal direction are connected to the positive electrode terminal 11a and the negative electrode terminal 11b of two batteries 11 disposed on both sides of the battery 11 to which the tab 131 is connected at the positive electrode terminal 11a, in the X-axis direction, respectively. The tab 2121 is disposed to straddle over the +Z direction side of the positive electrode terminal 11a to which the tab 131 is connected, in a state where the tab 2121 is separated from the tab 131. Here, assuming that the tab 2121 is a first tab, the tab 131 corresponds to the second tab. The tab 2171 also overlaps with a portion of the tab 181 when seen in the Z-axis direction. The tab 2171 has an elongated plate shape, and both end portions in a longitudinal direction are connected to the positive electrode terminal 11a and the negative electrode terminal 11b of two batteries 11 disposed on both sides of the battery 11 to which the tab 181 is connected at the positive electrode terminal 11a, in the X-axis direction, respectively. The tab 2171 is disposed to straddle over the −Z direction side of the positive electrode terminal 11a to which the tab 181 is connected, in a state where the tab 2171 is spaced apart from the tab 181.

In the battery pack 2 according to the present preferred embodiment, the tab 2121 is disposed on the +Z direction side of the six batteries 11, and the tab 2171 is disposed on the −Z direction side of the six batteries 11. Therefore, since the width of the battery pack 2 in the Y-axis direction can be reduced, a housing of the battery pack 2 can be made thinner.

Preferred Embodiment 3

A battery pack according to Preferred Embodiment 3 is different from the battery pack 1 according to Preferred Embodiment 1 in that a cylindrical axis of at least one of three or more batteries is arranged to be offset in the Y-axis direction from an imaginary plane including cylindrical axes of the other batteries and in parallel or substantially in parallel to the X-axis direction.

Figure 7A:
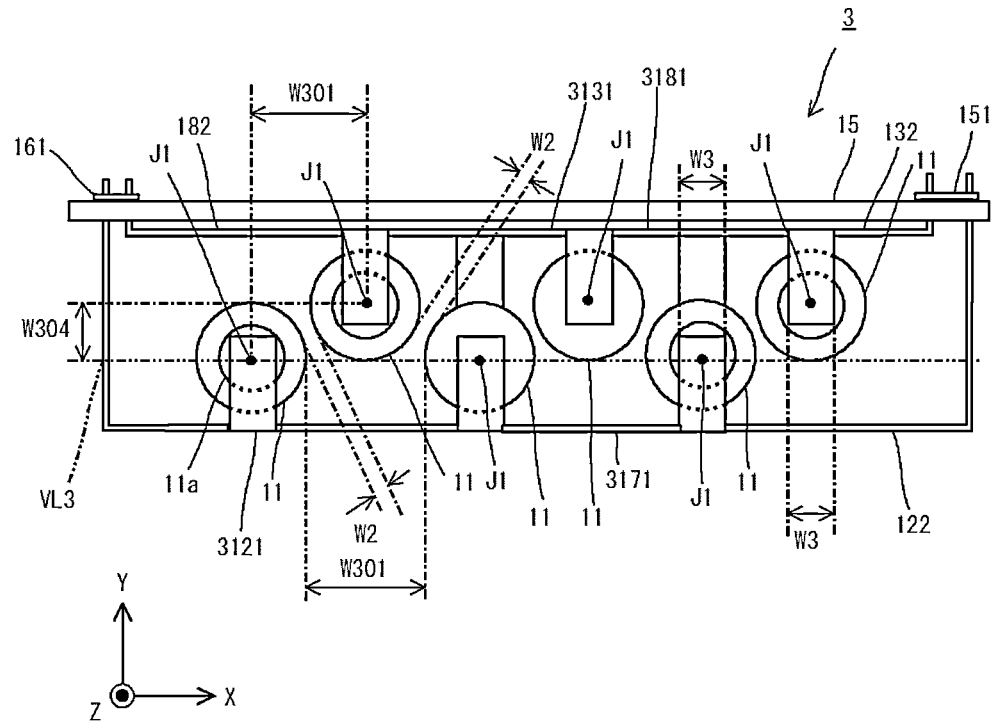
FIG. 7A is a plan view of a battery pack according to Preferred Embodiment 3 of the present invention.

As illustrated in FIG. 7A, a battery pack 3 according to the present preferred embodiment includes six batteries 11, tabs 3121, 122, 3131, 132, 3171, 3181, and 182, and the PCBs 15 and 16. In FIG. 7A, configurations the same as or similar to Preferred Embodiment 1 are assigned with the same reference characters as in FIG. 2A. Among the six batteries 11, the battery 11 on the most −X direction side and the batteries 11 at the third and fifth in the +X direction from the battery 11 on the most −X direction side are parallelly or substantially parallelly and linearly or substantially linearly aligned in the X-axis direction. Further, the batteries 11 at the second, fourth, and sixth in the +X direction from the battery 11 on the most −X direction side are parallelly or substantially parallelly aligned in a state where their cylindrical axes J1 are arranged to be offset in the +Y direction from an imaginary plane VL3 including the cylindrical axes J1 of the other batteries 11 and in parallel or substantially in parallel to the X-axis direction. The cylindrical axes J1 of the batteries 11 at the second, fourth, and sixth in the +X direction from the battery 11 on the most −X direction side are arranged to be offset from the imaginary plane VL3 by a distance W304. In other words without using the imaginary plane, the cylindrical axis J1 of the battery 11 at the first from left in FIG. 2A and the cylindrical axis J1 of the battery 11 at the third from left in FIG. 2A are arranged in a straight line parallel or substantially parallel to the X direction in which the batteries 11 are aligned. Also, the cylindrical axis J1 of the battery 11 at the second from left in FIG. 2A, which is different from the above-described battery 11, and the cylindrical axis J1 of the battery 11 at the first from left in FIG. 2A are arranged in a straight line not parallel to the X direction in which the batteries 11 are aligned. The distance W304 is set to be a length, for example, at or smaller than a radius of the battery 11 when the battery 11 is seen in the Z-axis direction. The six batteries 11 are each disposed such that the shortest distance to the nearest battery 11 is a distance W2. Here, a distance W301 between the cylindrical axes J1 of the two adjacent batteries 11 in the X-axis direction may be shorter than the distance W1 in the battery pack 1 according to Preferred Embodiment 1.

The tab 3121 electrically connects the positive electrode terminal 11a of the battery 11 on the most −X direction side to the negative electrode terminal 11b of the battery 11 at the third from the most −X direction side. The tab 3131 electrically connects the positive electrode terminal 11a of the battery 11 at the second in the +Z direction from the battery 11 on the most −X direction side, to the negative electrode terminal 11b of the battery 11 at the fourth in the +X direction from the battery 11 on the most −X direction side. The tab 3171 electrically connects the positive electrode terminal 11a of the battery 11 at the third in the +X direction from the battery 11 on the most −X direction side, to the negative electrode terminal 11b of the battery 11 at the second in the −X direction from the battery 11 on the most +X direction side. The tab 3181 electrically connects the negative electrode terminal 11b of the battery 11 on the most +X direction side to the positive electrode terminal 11a of the battery 11 at the third in the −X direction from the battery 11 on the most +X direction side.

Figure 7B:
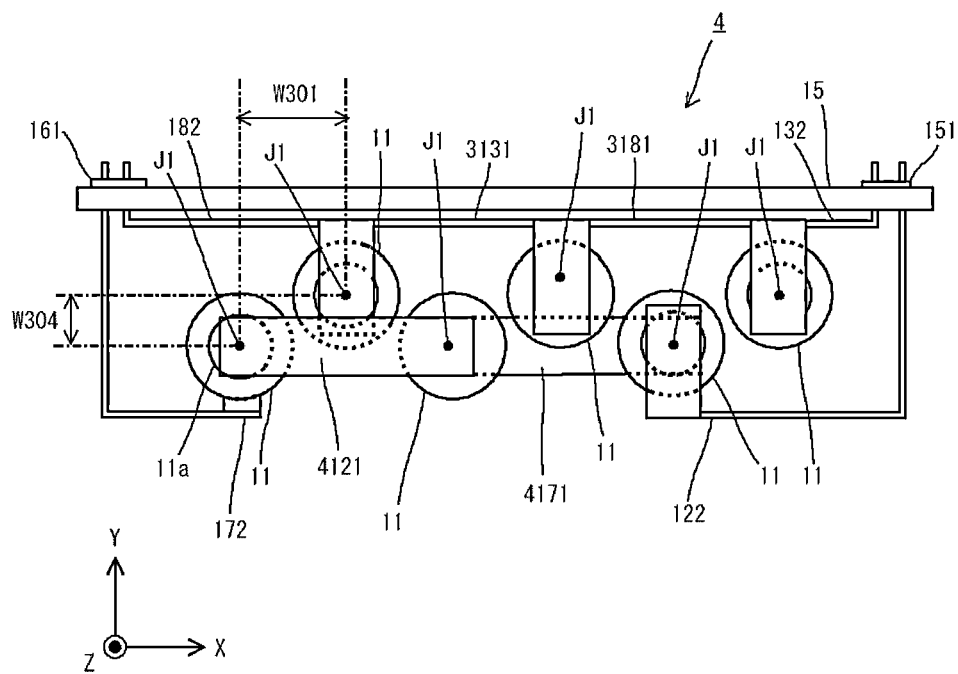
FIG. 7B is a plan view of a battery pack according to a modification of Preferred Embodiment 3 of the present invention.

As in a battery pack 4 illustrated in FIG. 7B, it may be structured to include a tab 4121 having an elongated plate shape and overlapping with a portion of the tab 3131 when seen in the Z-axis direction, and a tab 4171 having an elongated plate shape and overlapping with a portion of the tab 3181 when seen in the Z-axis direction. Here, the shapes of the tabs 4121 and 4171 may be the same as or similar to those of the tabs 2121 and 2171 described in Preferred Embodiment 2.

In the battery packs 3 and 4 according to the present preferred embodiment, the distance W301 between the cylindrical axes J1 of the two adjacent batteries 11 in the X-axis direction is shorter than the distance W1 in the battery pack 1 according to Preferred Embodiment 1. Therefore, since the length in the X-axis direction can be made shorter than the battery pack 1 according to Preferred Embodiment 1, the battery pack 3 can be downsized.

Preferred Embodiment 4

A battery pack according to Preferred Embodiment 4 is different from the battery pack 1 according to Preferred Embodiment 1 in that one tab intersects with another tab at least at one point when seen in plan view from the Y-axis direction.

Figure 8:
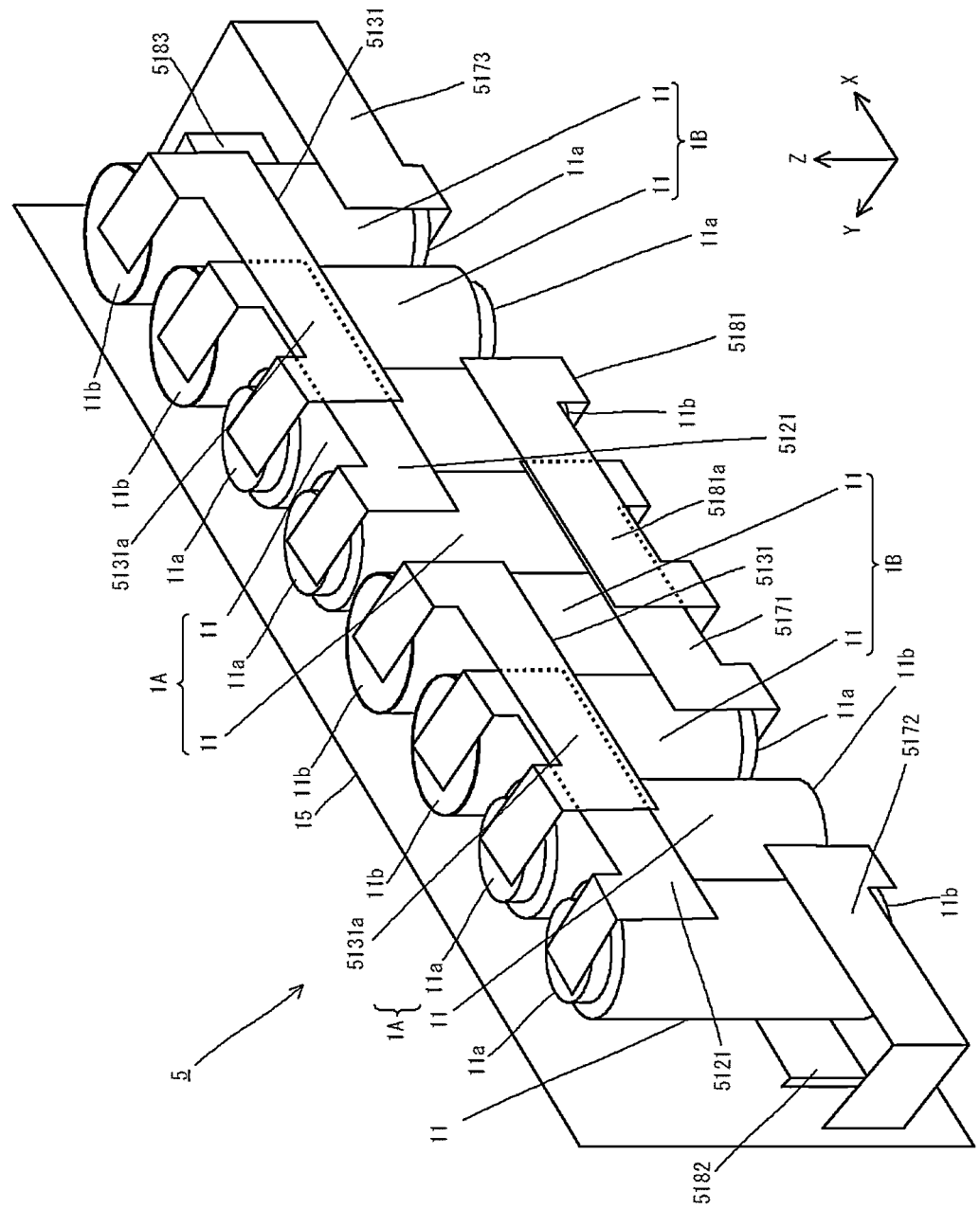
FIG. 8 is a perspective view of a battery pack according to Preferred Embodiment 4 of the present invention.
Figure 9A:
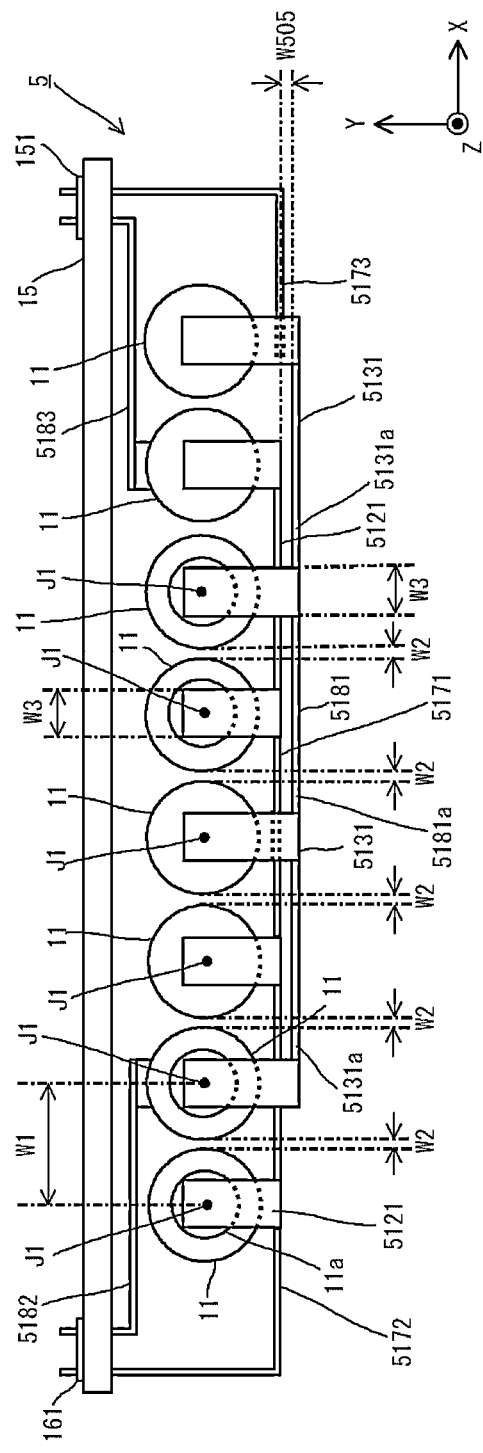
FIG. 9A is a plan view of the battery pack according to Preferred Embodiment 4 of the present invention.
Figure 9B:
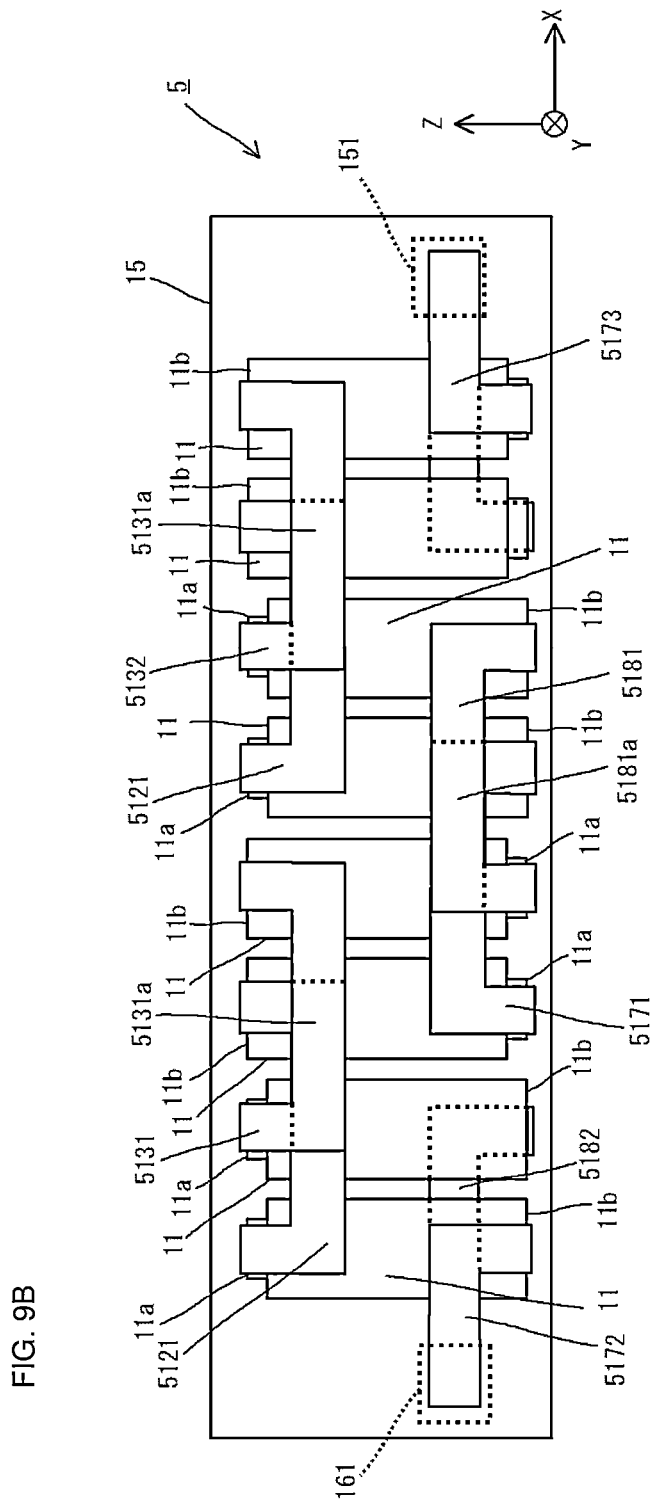
FIG. 9B is a side view of the battery pack according to Preferred Embodiment 4 of the present invention.

As illustrated in FIG. 8 and FIGS. 9A and 9B, a battery pack 5 according to the present preferred embodiment includes eight batteries 11, tabs 5121, 5131, 5171, 5172, 5173, 5181, 5182, and 5183, and the PCBs 15 and 16. In FIGS. 8 and 9A, and 9B, configurations the same as or similar to Preferred Embodiment 1 are assigned with the same reference characters as in FIGS. 1 and 2A, and 2B. The eight batteries 11 include two first battery sets 1A and two second battery sets 1B, which are arranged alternately in the X-axis direction. The first battery set 1A includes two batteries 11 each disposed such that the direction from the positive electrode terminal 11a to the negative electrode terminal 1lb in the direction of the cylindrical axis J1 matches the −Z direction. The second battery set 1B includes two batteries 11 each disposed such that the direction from the positive electrode terminal 11a to the negative electrode terminal 1lb in the direction of the cylindrical axis J1 matches the +Z direction (a third direction).

One of the two tabs 5121 on the −X direction side electrically connects the positive electrode terminal 11a of the battery 11 on the most −X direction side to the negative electrode terminal 11b of the battery 11 at the third in the +X direction from the battery 11 on the most −X direction side. The other one of the two tabs 5121 on the +X direction side electrically connects the positive electrode terminal 11a of the battery 11 at the fifth in the +X direction from the battery 11 on the most −X direction side, to the negative electrode terminal 11b of the battery 11 at the seventh in the +X direction from the battery 11 on the most −X direction side. One of the two tabs 5131 on the −X direction side electrically connects the positive electrode terminal 11a of the battery 11 at the second in the +X direction from the battery on the most −X direction side, to the negative electrode terminal 11b of the battery 11 at the fourth in the +X direction from the battery 11 on the most −X direction side. The other one of the two tabs 5131 on the +X direction side electrically connects the positive electrode terminal 11a of the battery 11 at the sixth in the +X direction from the battery 11 on the most −X direction side, to the negative electrode terminal 11b of the battery 11 on the most +X direction side. Here, the tab 5121 intersects with the tab 5131 at least one point when seen in plan view in a second direction (Y-axis direction) perpendicular or substantially perpendicular to the direction of the cylindrical axis J1 and the first direction (X-axis direction). Here, assuming that the tab 5121 is a first tab, the tab 5131 corresponds to a second tab. Further, an overlapping portion 5131a of the tab 5131 with the tab 5121 is arranged to be spaced apart from the tab 5121 by a distance W505 in the Y-axis direction.

As illustrated in FIGS. 9A and 9B, the tabs 5172 and 5182 are each fixed at one end portion to the PCB 15, and are electrically connected to each other through the conductive pattern 161 provided in the PCB 15. Further, the tab 5172 is electrically connected to the negative electrode terminal 11b of the battery 11 on the most −X direction side. Moreover, the tab 5182 is electrically connected to the negative electrode terminal 11b of the battery 11 at the second in the +X direction from the battery 11 on the most −X direction side. The tabs 5173 and 5183 are each fixed at one end portion to the PCB 15, and are electrically connected to each other through the conductive pattern 151 formed in the PCB 15. Further, the tab 5173 is electrically connected to the positive electrode terminal 11a of the battery 11 on the most +X direction side. Moreover, the tab 5183 is electrically connected to the positive electrode terminal 11a of battery 11 at the second in the −X direction from the battery 11 on the most +X direction side.

The tab 5171 electrically connects the positive electrode terminal 11a of the battery 11 at the third in the +X direction from the battery 11 on the most −X direction side, to the negative electrode terminal 11b of the battery 11 at the fifth in the +X direction from the battery 11 on the most −X direction side. The tab 5181 electrically connects the positive electrode terminal 11a of the battery 11 at the fourth in the +X direction from the battery 11 on the most −X direction side, to the negative electrode terminal 11b of the battery 11 at the sixth in the +X direction from the battery 11 on the most −X direction side. Here, the tab 5181 overlaps with a portion of the tab 5171 when seen from the −Y direction. An overlapping portion 5181a of the tab 5181 with the tab 5171 is arranged to be spaced apart from the tab 5171 by the distance W505 in the Y-axis direction. In this manner, the eight batteries 11 are connected to each other between the conductive patterns 151 and 161 of the PCB 15 to be two in parallel and four in series by the tabs 5121, 5131, 5171, 5172, 5173, 5181, 5182, and 5183.

In the battery pack 5 according to the present preferred embodiment, since the tabs 5121, 5131, 5171, 5172, 5173, and 5181 are all capable of being arranged on the −Y direction side of the eight batteries 11, the space on the +Y direction side of the eight batteries 11 can be saved.

Figure 10A:
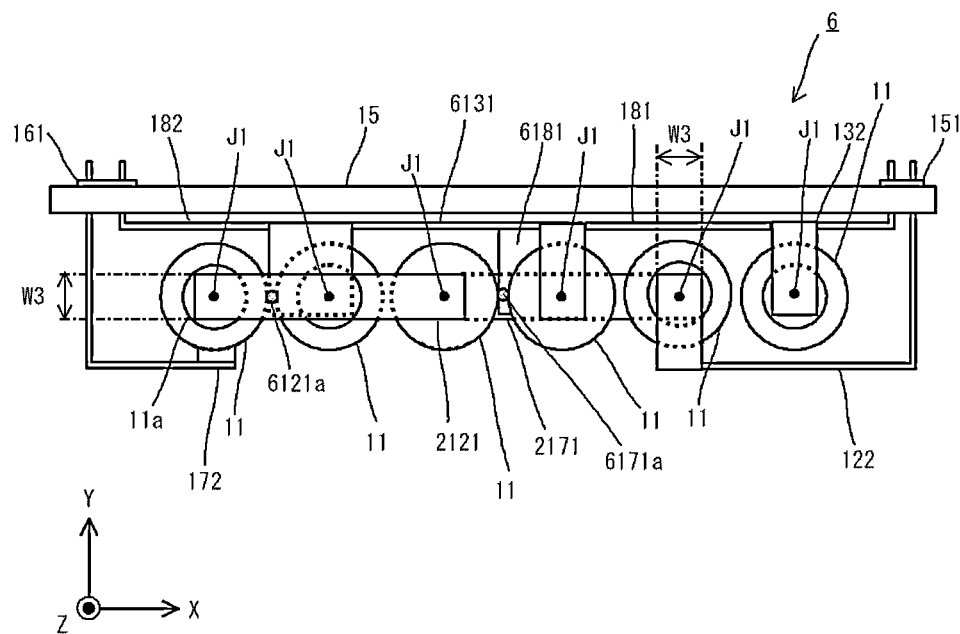
FIG. 10A is a plan view of a battery pack according to a modification of a preferred embodiment of the present invention.
Figure 10B:
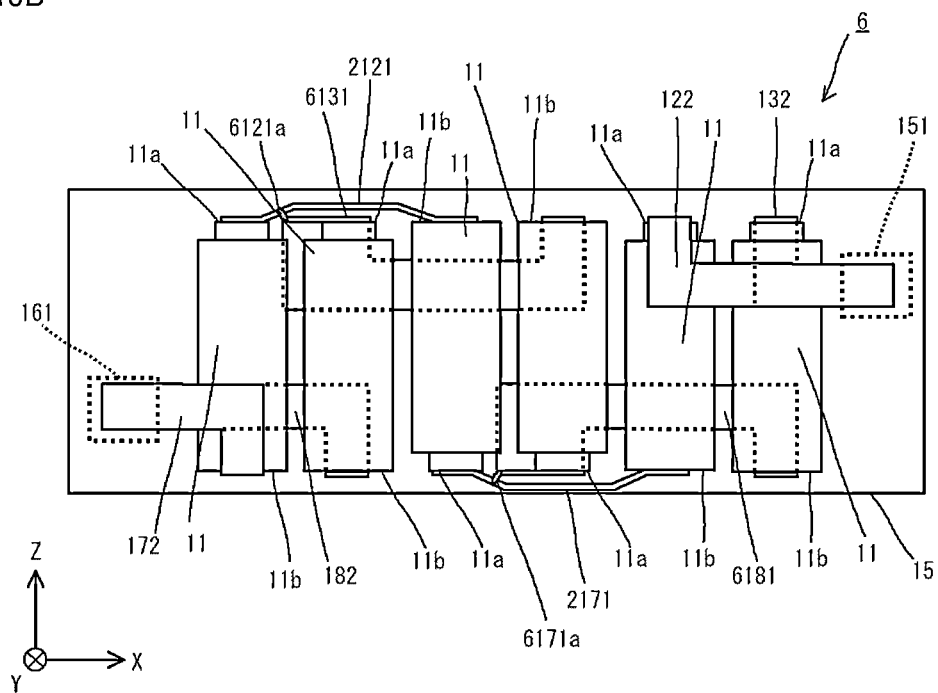
FIG. 10B is a side view of the battery pack according to the modification of a preferred embodiment of the present invention shown in FIG. 10A.

Although each preferred embodiment of the present invention has been described above, the present invention is not limited to the configurations of the preferred embodiments described above. For example, as in a battery pack 6 illustrated in FIGS. 10A and 10B, the tabs 2121 and 2171 may be coupled to tabs 6131 and 6181 using coupling portions 6121a and 6171a at portions overlapping with the tabs 6131 and 6181 when seen in the Z-axis direction, respectively. In FIGS. 10A and 10B, configurations the same as or similar to Preferred Embodiment 1 are assigned with the same reference characters as in FIGS. 2A and 2B. Here, a portion of the tab 6131 connected to the positive electrode terminal 11a of the battery 11 has a shape projecting to the −X direction side from the positive electrode terminal 11a. Moreover, a portion of the tab 6181 connected to the positive electrode terminal 11a of the battery 11 also has a shape projecting to the −X direction side from the positive electrode terminal 11a. That is, each of the tabs 6131 and 6181 has, at the portion connected to the positive electrode terminal 11a of the battery 11, a width in the direction perpendicular or substantially perpendicular to their extending direction and thickness direction larger than the width at other portions. The coupling portions 6121a and 6171a are formed by, for example, resistance spot welding, laser spot welding, or the like. Moreover, each of the coupling portions 6121a and 6171a has a thermal resistance per unit length larger than thermal resistances per unit length of the tabs 2121, 6131, 2171, and 6181.

Figure 11:
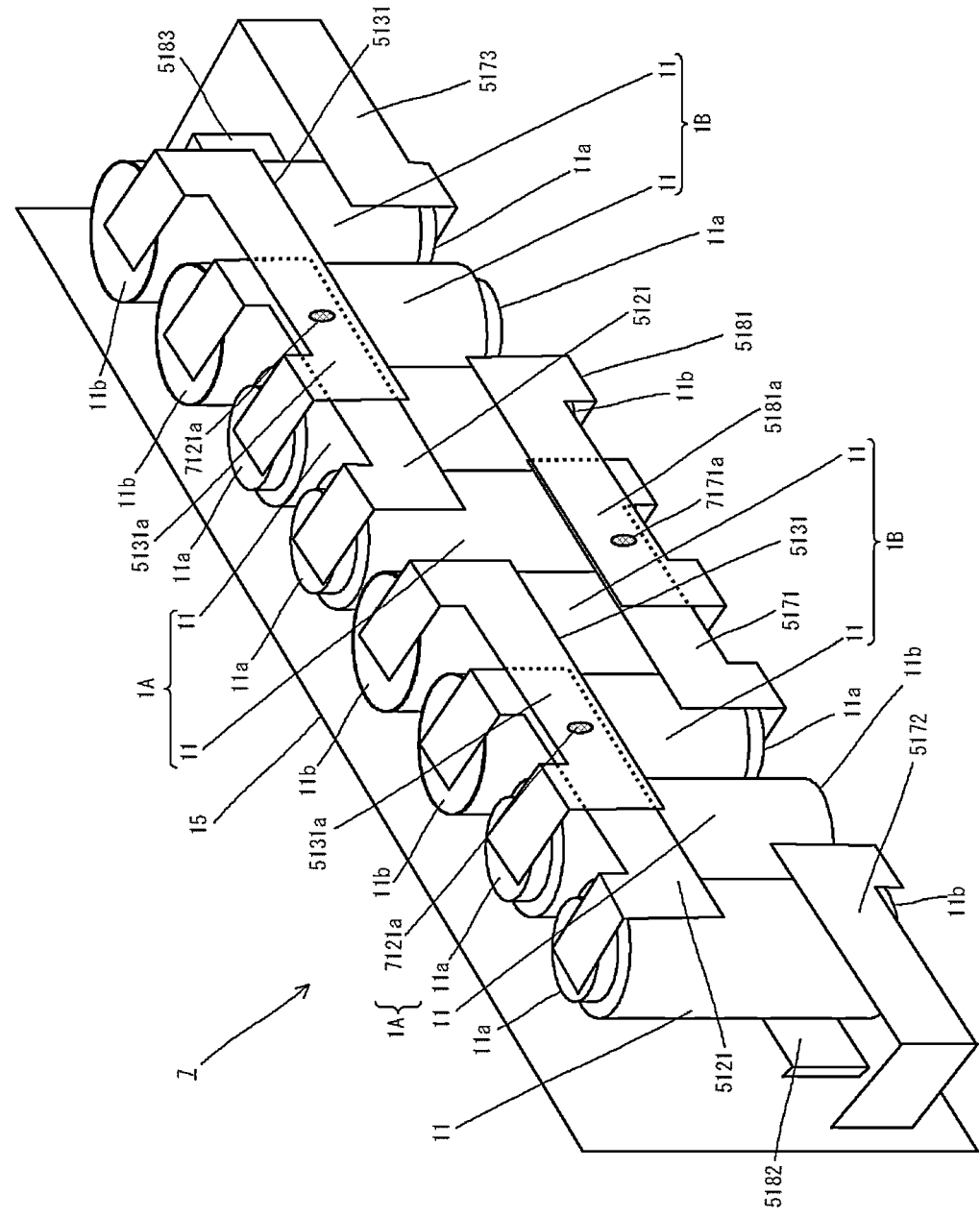
FIG. 11 is a perspective view of a battery pack according to a modification of a preferred embodiment of the present invention.

Alternatively, has in a battery pack 7 illustrated in FIG. 11, the tabs 5131 and 5181 may be coupled to the tabs 5121 and 5171 using coupling portions 7121a and 7171a at the overlapping portions 5131a and 5181a with the tabs 5121 and 5171 when seen in the Z-axis direction, respectively. Here, each of the coupling portions 7121a and 7171a has a thermal resistance per unit length larger than thermal resistances per unit length of the tabs 5121, 5131, 5171, and 5181.

In this configuration, since the tabs 2121 and 2171 are coupled to the tabs 6131 and 6181 using the coupling portions 6121a and 6171a, the resistance caused between the tabs 2121 and 2171 and tabs 6131 and 6181, respectively, can be reduced.

Figure 12:
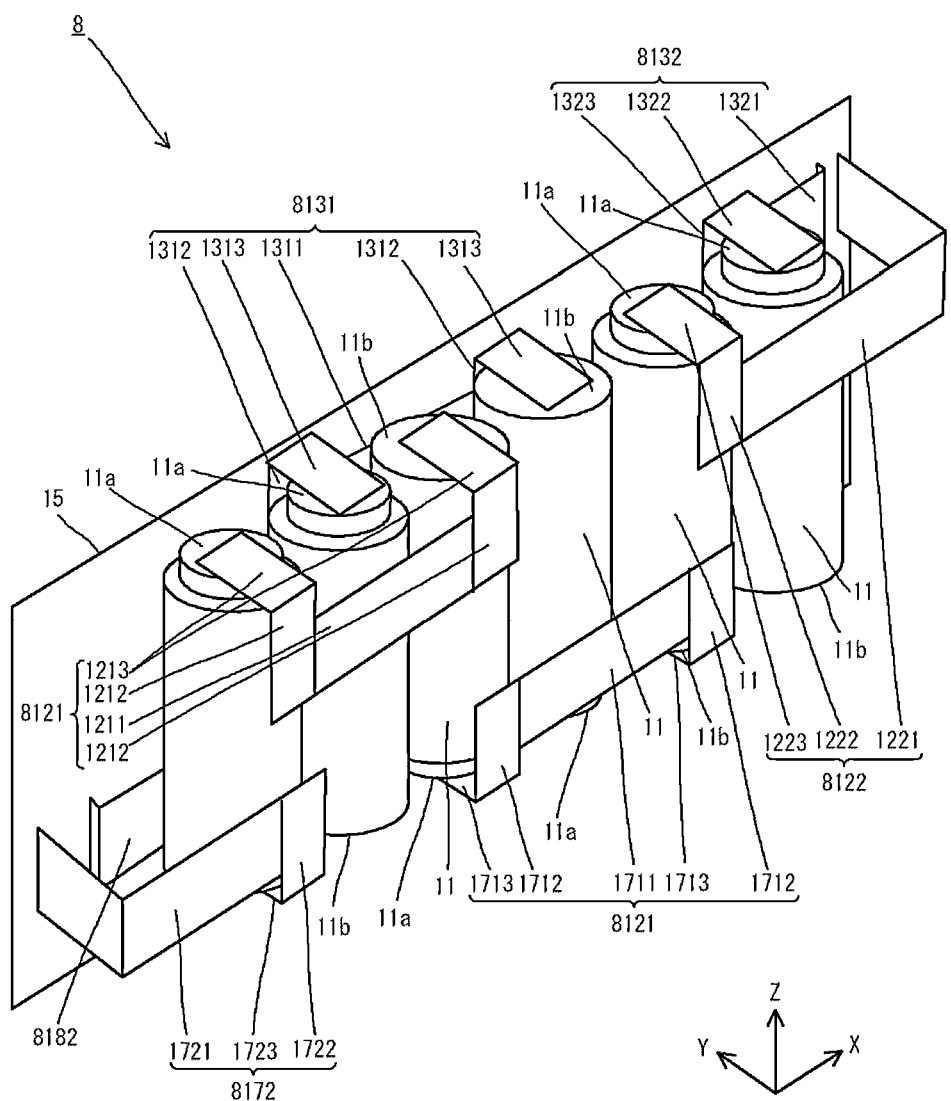
FIG. 12 is a perspective view of a battery pack according to a modification of a preferred embodiment of the present invention.

In Preferred Embodiment 1, each of the tabs 121, 122, 131, 132, 171, 172, 181, and 182 may include a plurality of subtabs. For example, as in a battery pack 8 illustrated in FIG. 12, a tab 8121 may include five subtabs 1211, 1212, and 1213, and a tab 8131 may include five subtabs 1311, 1312, and 1313. Further, a tab 8171 may include five subtabs 1711, 1712, and 1713. Moreover, a tab 8122 may include three subtabs 1221, 1222, and 1223, and a tab 8132 may include three subtabs 1321, 1322, and 1323. Further, a tab 8172 may include three subtabs 1721, 1722, and 1723, and a tab 8182 may include three subtabs.

Figure 13:
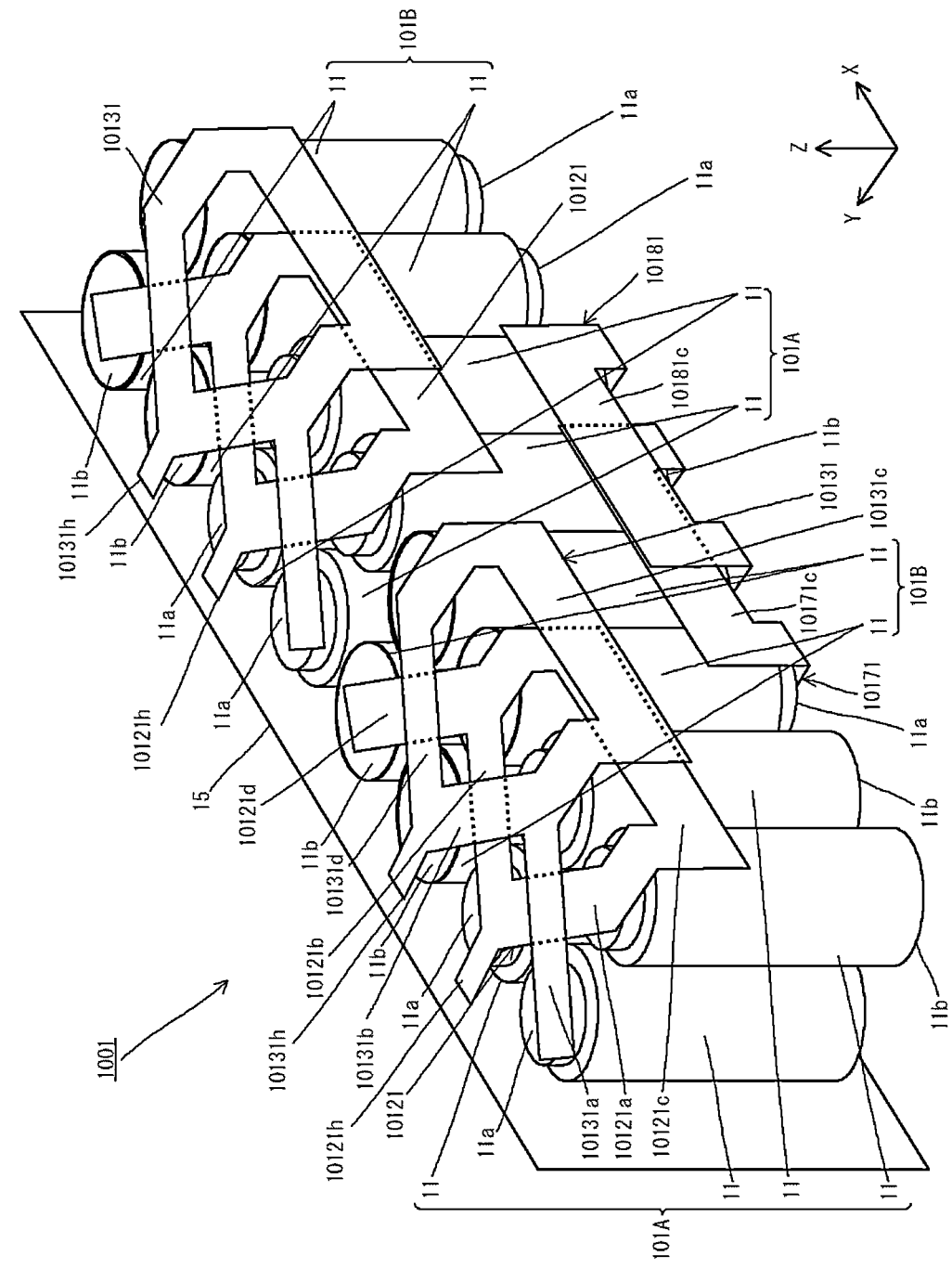
FIG. 13 is a perspective view of a battery pack according to a modification of a preferred embodiment of the present invention.

Although, in each preferred embodiment, the configuration has been described in which the plurality of batteries 11 are parallelly or substantially parallelly and linearly or substantially linearly aligned in the X-axis direction, the arrangement of the batteries 11 is not limited to this. For example, as in a battery pack 1001 illustrated in FIG. 13, it may be structured to include a first battery assembly which includes four batteries 11 parallelly or substantially parallelly aligned in the X-axis direction, and a second battery assembly which includes four batteries 11 disposed adjacent to the above-described four batteries 11 of the first battery assembly on the +Y direction side. In FIG. 13, configurations the same as or similar to Preferred Embodiment 1 are assigned with the same reference characters as in FIG. 1. In other words, the first battery assembly and the second battery assembly include the battery 11 on the most −X direction side on the −Y direction side as the first battery, the battery 11 next to the first battery on the +X direction side as the second battery, the battery 11 next to the second battery on the +X direction side as the third battery, the battery 11 next to the third battery on the +X direction side as the fourth battery, a fifth battery next to the first battery in the second direction (that is, on the +Y direction side), a sixth battery next to the second battery on the +Y direction side, a seventh battery next to the third battery on the +Y direction side, and an eighth battery next to the fourth battery on the +Y direction side. The battery pack 1001 includes two first battery sets 101A and two second battery sets 101B, and the first battery sets 101A and the second battery sets 101B are arranged alternately in the X-axis direction. The first battery set 101A includes four batteries 11 parallelly or substantially parallelly aligned to be two batteries 11 in the X-axis direction and two batteries 11 in the Y-axis direction (that is, 2 rows and 2 columns) such that the positive electrode terminals 11a are located on the +Z direction side of the batteries 11. The second battery set 101B includes four batteries 11 parallelly or substantially parallelly aligned to be two batteries 11 in the X-axis direction and two batteries 11 in the Y-axis direction (that is, 2 rows and 2 columns) such that the positive electrode terminals 11a are located on the −Z direction side. Moreover, the battery pack 1001 includes tabs 10121, 10131, 10133, 10171, and 10181, and the PCB (not illustrated). The tabs 10121 and 10131 are each fixed at one end portion to the PCB, and are electrically connected to each other through the conductive pattern (not illustrated) formed in the PCB 15.

The tabs 10121 and 10131 intersect with each other at three points when seen in plan view in the direction of the cylindrical axes J1 of the eight batteries 11. The tab 10121 includes connecting pieces 10121a and 10121b and 10121d and extending pieces 10121c and 10121h. Here, the connecting piece 10121a connects the positive electrode terminal 11a of the battery 11 on the −Y direction side to the positive electrode terminal 11a of the battery 11 on the +X direction side and the +Y direction side of the above-described battery 11. The connecting piece 10121b connects the positive electrode terminal 11a of the battery 11 on the +Y direction side to the negative electrode terminal 11b of the battery 11 on the +X direction side and the −Y direction side of the above-described battery 11. A connecting piece 10121d connects the negative electrode terminal 11b of the battery 11 on the −Y direction side to the negative electrode terminal 11b of the battery 11 on the +X direction side and the +Y direction side of the above-described battery 11. That is, the tab 10121 is provided to connect each of the eight batteries 11 parallelly or substantially parallelly aligned in the X-axis direction on the −Y direction side, to one of the eight adjacent batteries 11 in the +Y direction, other than the battery 11 having the shortest distance from the battery 11 on the −Y direction side.

The extending piece 10121c continues to the connecting pieces 10121a, 10121b, and 10121d, and connects the positive electrode terminal 11a of the battery 11 on the most −X direction side to the negative electrode terminal 11b of the battery 11 at the third in the +X direction from the battery 11 on the most −X direction side. That is, the tab 10121 is the first tab connected to the first battery, the third battery, the sixth battery, and the eighth battery without being connected to the second battery, the fourth battery, the fifth battery, or the seventh battery. Another extending piece 10121c continues to other connecting pieces 10121a, 10121b, and 10121d, and connects the positive electrode terminal 11a of the battery 11 at the fifth in the +X direction from the most −X direction side, to the negative electrode terminal 11b of the battery 11 at the seventh in the +X direction from the battery 11 on the most −X direction side. The extending piece 10121h extends in the +Y direction from a connection portion between the connecting pieces 10121a and 10121b, and a tip-end portion thereof is connected to the PCB 15.

The tab 10131 includes connecting pieces 10131a and 10131b and 10131d and extending pieces 10131c and 10131h. The connecting piece 10131a connects the positive electrode terminal 11a of the battery 11 on the +Y direction side to the positive electrode terminal 11a of the battery 11 on the +X direction side and the −Y direction side of the above-described battery 11. The connecting piece 10131b connects the positive electrode terminal 11a of the battery 11 on the −Y direction side to the negative electrode terminal 11b of the battery 11 on the +X direction side and the +Y direction side of the above-described battery 11. A connecting piece 10131d connects the negative electrode terminal 11b of the battery 11 on the +Y direction side to the negative electrode terminal 11b of the battery 11 on the +X direction side and the −Y direction side of the above-described battery 11. That is, the tab 10131 is provided to connect each of the eight batteries 11 parallelly aligned in the X-axis direction on the +Y direction side, to one of the eight adjacent batteries 11 in the −Y direction, other than the battery 11 having the shortest distance from the battery 11 on the +Y direction side.

The extending piece 10131c continues to the connecting pieces 10131a, 10131b, and 10131d, and electrically connects the positive electrode terminal 11a of the battery 11 at the second in the +X direction from the battery 11 on the most −X direction side, to the negative electrode terminal 11b at the fourth in the +X direction from the battery 11 on the most −X direction side. That is, the tab 10131 is the second tab connected to the second battery, the fourth battery, the fifth battery, and the seventh battery without being connected to the first battery, the third battery, the sixth battery, or the eighth battery. Another extending piece 10131c continues to other connecting pieces 10131a and 10131b, and electrically connects the positive electrode terminal 11a of the battery 11 at the sixth in the +X direction from the battery 11 on the most −X direction side, to the negative electrode terminal 11b of the battery 11 at the eighth in the +X direction from the battery 11 on the most −X direction side. The extending piece 10131h extends in the +Y direction from a connection portion between the connecting pieces 10131b and 10131d, and a tip-end portion thereof is connected to the PCB 15.

Note that the tabs 10171 and 10181 have the shapes similar to the tabs 10121 and 10131, respectively. An extending piece 10171c of the tab 10171 electrically connects the positive electrode terminal 11a of the battery 11 at the third in the +X direction from the battery 11 on the most −X direction side, to the negative electrode terminal 11b of the battery 11 at the fifth in the +X direction from the battery 11 on the most −X direction side. An extending piece 10181c of the tab 10181 electrically connects the positive electrode terminal 11a of the battery 11 at the fourth in the +X direction from the battery 11 on the most −X direction side, to the negative electrode terminal 11b of the battery 11 at the sixth in the +X direction from the battery 11 on the most −X direction side. Each of the tabs 10171 and 10181 is connected to the PCB 15.

Figure 14A:
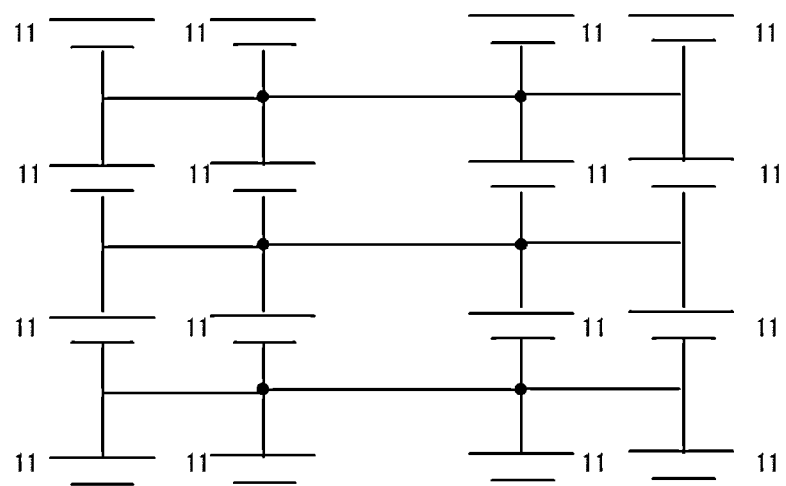
FIG. 14A is a circuit diagram illustrating an equivalent circuit of the battery pack according to a modification of a preferred embodiment of the present invention.
Figure 14B:
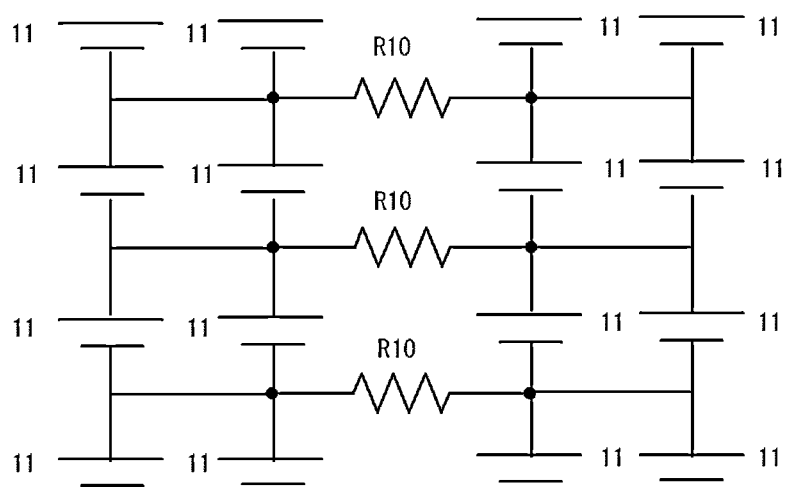
FIG. 14B is a circuit diagram illustrating an equivalent circuit of the battery pack according to a modification of a preferred embodiment of the present invention.

Here, on the PCB 15, when the extending pieces 10121h and 10131h are connected to each other without resistance being interposed therebetween, the battery pack 1001 can be represented by an equivalent circuit as illustrated in FIG. 14A. On the other hand, on the PCB 15, when the extending pieces 10121h and 10131h are connected to each other with resistance R10 being interposed therebetween, the battery pack 1001 can be represented by an equivalent circuit as illustrated in FIG. 14B.

Figure 15:
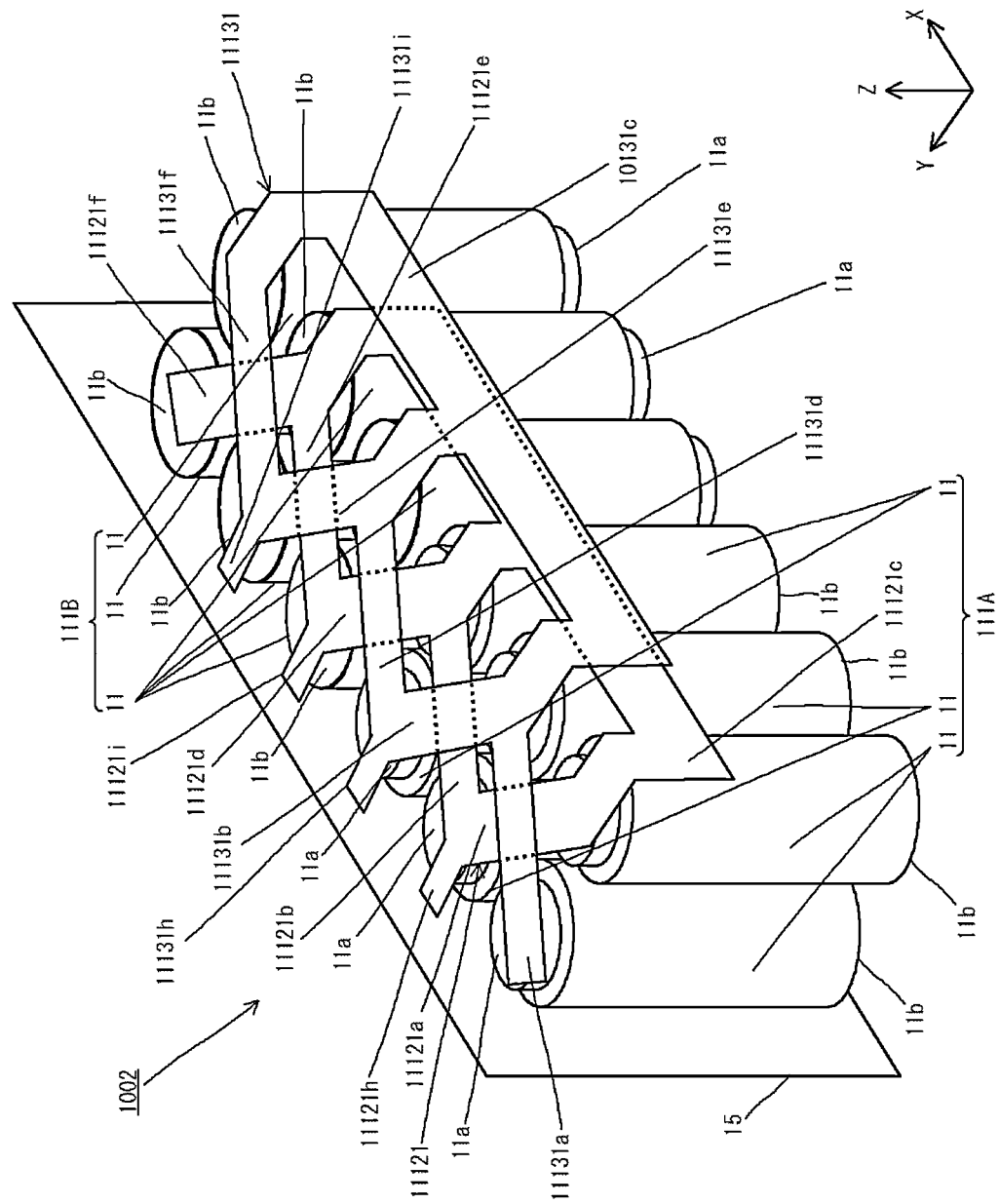
FIG. 15 is a perspective view of a battery pack according to a modification of a preferred embodiment of the present invention.

Further, like a battery pack 1002 as illustrated in FIG. 15, it may be structured to include a first battery set 111A which consists of six batteries 11 and a second battery set 111B which consists of six batteries 11. Here, the first battery set 111A consists of six batteries 11 parallelly aligned to be three batteries 11 in the X-axis direction and two batteries 11 in the Y-axis direction in a posture where the positive electrode terminals 11a are located on the +Z direction side of the batteries 11. The second battery set 111B consists of six batteries 11 parallelly aligned to be three batteries 11 in the X-axis direction and two batteries 11 in the Y-axis direction in a posture where the positive electrode terminals 11a are located on the −Z direction side.

The tabs 11121 and 11131 intersect with each other at five points when seen in plan view in the direction of the cylindrical axes J1 of the twelve batteries 11. The tab 11121 has connecting pieces 11121a, 11121b, 11121d, 11121e, and 11121f and extending pieces 11121c, 11121h, and 11121i. Here, the connecting piece 11121a connects the positive electrode terminal 11a of the battery 11 on the −Y direction side to the positive electrode terminal 11a of the battery 11 on the +X direction side and the +Y direction side of the above-described battery 11. The connecting piece 11121b connects the positive electrode terminal 11a of the battery 11 on the +Y direction side to the positive electrode terminal 11a of the battery 11 on the +X direction side and the −Y direction side of the above-described battery 11. The connecting piece 11121d connects the positive electrode terminal 11a of the battery 11 on the −Y direction side to the negative electrode terminal 11b of the battery 11 on the +X direction side and the +Y direction side of the above-described battery 11. The connecting piece 11121e connects the negative electrode terminal 11b of the battery 11 on the +Y direction side to the negative electrode terminal 11b of the battery 11 on the +X direction side and the −Y direction side of the above-described battery 11. The connecting piece 11121f connects the negative electrode terminal 11b of the battery 11 on the −Y direction side to the negative electrode terminal 11b of the battery 11 on the +X direction side and the +Y direction side of the above-described battery 11. That is, the tab 11121 is provided to connect each of the six batteries 11 parallelly aligned in the X-axis direction on the −Y direction side, to one of the six adjacent batteries 11 in the +Y direction, other than the battery 11 having the shortest distance from the battery 11 on the −Y direction side.

The extending piece 11121c continues to the connecting pieces 11121a, 11121b, 11121d, 11121e, and 11121f, and electrically connects the positive electrode terminal 11a of the battery 11 on the most −X direction side, the positive electrode terminal 11a of the battery 11 at the third in the +X direction from the battery 11 on the most −X direction side, and the negative electrode terminal 11b of the battery 11 at the fifth in the +X direction from the battery 11 on the most −X direction side. The extending piece 11121h extends in the +Y direction from a connection portion between the connecting pieces 11121a and 11121b, and a tip-end portion thereof is connected to the PCB 15. The extending piece 11121i extends in the +Y direction from a connection portion between the connecting pieces 11121d and 11121e, and a tip-end portion thereof is connected to the PCB 15.

The tab 11131 includes connecting pieces 11131a, 11131b, 11131d, 11131e, and 11131f and extending pieces 11131c, 11131h, and 11131i. The connecting piece 11131a connects the positive electrode terminal 11a of the battery 11 on the +Y direction side to the positive electrode terminal 11a of the battery 11 on the +X direction side and the −Y direction side of the above-described battery 11. The connecting piece 11131b connects the positive electrode terminal 11a of the battery 11 on the −Y direction side to the positive electrode terminal 11a of the battery 11 on the +X direction side and the +Y direction side of the above-described battery 11. The connecting piece 11131d connects the positive electrode terminal 11a of the battery 11 on the +Y direction side to the negative electrode terminal 11b of the battery 11 on the +X direction side and the −Y direction side of the above-described battery 11. The connecting piece 11131e connects the negative electrode terminal 11b of the battery 11 on the −Y direction side to the negative electrode terminal 11b of the battery 11 on the +X direction side and the +Y direction side of the above-described battery 11. The connecting piece 11131f connects the negative electrode terminal 11b of the battery 11 on the +Y direction side to the negative electrode terminal 11b of the battery 11 on the +X direction side and the −Y direction side of the above-described battery 11. That is, the tab 11131 is provided to connect each of the six batteries 11 parallelly aligned in the X-axis direction on the +Y direction side, to one of the six adjacent batteries 11 in the −Y direction, other than the battery 11 having the shortest distance from the battery 11 on the +Y direction side.

The extending piece 11131c continues to the connecting pieces 11131a, 11131b, 11131d, 11131e, and 11131f, and electrically connects the positive electrode terminal 11a of the battery 11 at the second in the +X direction from the battery 11 on the most −X direction side, the negative electrode terminal 11b of the battery 11 at the fourth in the +X direction from the battery 11 on the most −X direction side, and the negative electrode terminal 11b of the battery 11 on the most +X direction side. The extending piece 11131h extends in the +Y direction from a connection portion between the connecting pieces 11131b and 11131d, and a tip-end portion thereof is connected to the PCB 15. The extending piece 11131i extends in the +Y direction from a connection portion between the connecting pieces 11131e and 11131f, and a tip-end portion thereof is connected to the PCB 15.

Although, in this modification, an example has been described in which each of the first battery set 111A and the second battery set 111B includes six batteries 11, the number of batteries 11 of each of the first battery set and the second battery set is not limited to six. For example, each of the first battery set and the second battery set may include eight or more batteries 11.

In this configuration, the eight batteries 11 are connected to each other by the extending pieces 10121c and 10131c of the tabs 10121 and 10131 or the extending pieces 10171c and 10181c of the tabs 10171 and 10181. Alternatively, the twelve batteries 11 are connected to each other by the extending pieces 11121c and 11131c of the tabs 11121 and 11131. Therefore, resistance caused between the batteries 11 can be reduced.

Although, in the preferred embodiments, examples have been described in which the battery 11 is a cylindrical battery, the shape of the battery 11 is not limited to this, but may be a prismatic battery, for example.

Although the preferred embodiments and modifications of the present invention have been described above, the present invention is not limited to these. The present invention includes configurations in which the preferred embodiments and modifications are combined or changed as necessary.

Preferred embodiments of the present invention are suitable for an assembled battery including a plurality of batteries.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A battery pack comprising:
    a battery assembly including a plurality of batteries having a cylindrical or substantially cylindrical external shape arranged in a first direction perpendicular or substantially perpendicular to a cylindrical axis direction thereof in which cylindrical axes are in parallel or substantially in parallel, the plurality of batteries each including electrode terminals at an end portion on a positive side and at an end portion on a negative side in the cylindrical axis direction, respectively; and
    a tab to connect the electrode terminals at the end portions of the plurality of batteries on the positive side, respectively; wherein
    the plurality of batteries include a first battery, a second battery, and a third battery arranged in this order;
    the first battery, the second battery, and the third battery are spaced apart from each other at equal or substantially equal intervals; and
    the tab includes a first tab to be connected to the first battery and the third battery without being connected to the second battery.

2. The battery pack according to claim 1, wherein
    the plurality of batteries include a fourth battery adjacent to the third battery on a side opposite side from the second battery and to which the first tab is not connected;
    the tab includes a second tab; and
    the second tab is connected to the second battery and the fourth battery without being connected to the first battery and the third battery.

3. The battery pack according to claim 2, wherein the first tab intersects with the second tab at least at one point when seen in plan view from the positive side in the cylindrical axis direction.

4. The battery pack according to claim 2, wherein the first tab intersects with the second tab at least at one point when seen in plan view from a second direction perpendicular or substantially perpendicular to the cylindrical axis direction and the first direction.

5. The battery pack according to claim 4, wherein
    the plurality of batteries further include a fifth battery adjacent to the first battery in the second direction, a sixth battery adjacent to the second battery in the second direction, a seventh battery adjacent to the third battery in the second direction, and an eighth battery adjacent to the fourth battery in the second direction;
    the first tab is connected to the sixth battery and the eighth battery without being connected to the fifth battery and the seventh battery; and
    the second tab is connected to the fifth battery and the seventh battery without being connected to the sixth battery and the eighth battery.

6. The battery pack according to claim 2, wherein
    the first battery and the second battery include positive electrode terminals at the end portions on the positive side in the cylindrical axis direction, respectively; and
    the third battery and the fourth battery include negative electrode terminals at the end portions on the positive side in the cylindrical axis direction, respectively.

7. The battery pack according to claim 1, wherein the tab includes a plurality of subtabs.

8. The battery pack according to claim 1, wherein each of the plurality of batteries is a rechargeable secondary battery.

9. The battery pack according to claim 8, wherein the rechargeable secondary battery is a lithium-ion battery, a nickel metal hydride battery, or a nickel-cadmium battery.

10. The battery pack according to claim 1, wherein the plurality of batteries are spaced apart from each other at equal or substantially equal intervals.

11. The battery pack according to claim 1, wherein the tab is a metal plate made of Cu or Al.

12. The battery pack according to claim 1, wherein the tab is fixed at one end to a PCB.

13. The battery pack according to claim 1, wherein the cylindrical axis of at least one of the plurality of batteries is offset from cylindrical axis direction.

14. The battery pack according to claim 7, wherein the plurality of subtabs includes five subtabs.

15. The battery pack according to claim 7, wherein the plurality of subtabs includes three subtabs.

* * * * *